United States Patent Office 3,180,839
Patented Apr. 27, 1965

3,180,839
REGENERABLE PLATINUM-CONTAINING HYDROCARBON CONVERSION CATALYST AND METHOD OF PREPARATION THEREOF
James E. Connor, Wynnewood, Joseph A. Cahill, Philadelphia, and Clifford S. Shipley, Aldan, Pa., and Carl D. Keith, Summit, N.J., assignors of one-half each to The Atlantic Refining Company, Philadelphia, Pa., a corporation of Pennsylvania, and Engelhard Industries, Inc., Newark, N.J., a corporation of Delaware
No Drawing. Filed Sept. 8, 1961, Ser. No. 136,745
8 Claims. (Cl. 252—439)

This application is a continuation-in-part of our copending application Serial No. 64,715, filed October 25, 1960, entitled "Regenerable Platinum-Containing Reforming Catalyst," now abandoned.

This invention relates to improvements in catalysts for the conversion of hydrocarbons. More particularly, it relates to platinum-containing hydrocarbon conversion catalysts which may be regenerated to restore substantially their initial activity and stability.

The catalysts of this invention, in general, comprise composite masses such as pellets, rods, extruded shapes, and the like, each of such masses being a physical mixture of particles of alumina upon which is deposited platinum and particles of a silica-alumina cracking component upon which is deposited a manganese compound and, as compared with previously known platinum-containing hydrocarbon conversion catalysts, exhibit superior regeneration characteristics. It has been determined now that these catalysts are not only useful for the reforming of hydrocarbons as disclosed in the above-mentioned copending application, but are also excellent catalysts for isomerizing alkylated benzene hydrocarbons.

One of the earliest reforming catalysts consisted of platinum deposited upon a silica-alumina cracking component in which the cracking activity of the silica-alumina could be controlled to a desired level. Such a catalyst had the important advantage, as compared to catalysts wherein the platinum was deposited on other carrier materials, of producing, in addition to high octane gasoline, a more desirable distribution of light hydrocarbon products. The platinized silica-alumina catalysts, however, did not exhibit a high activity over a long life span, and therefore, it was necessary in commercial operation that they be removed and replaced with fresh catalyst at rather frequent intervals.

Subsequently, there was developed an improved platinum-containing reforming catalyst which exhibited a higher activity over an appreciably longer life span as compared with the above-described platinized silica-alumina catalysts. This improved catalyst consisted of particles of alumina upon which had been deposited platinum in physical admixture with particles of silica-alumina. This catalyst also retained the product distribution advantages of the platinized silica-alumina catalysts. For example, when compared with a conventional platinized alumina reforming catalyst it produced from 2 to nearly 4 times the yield of butanes and up to 2 times the yield of propane together with a 55 percent to 60 percent smaller yield of methane and ethane when the yields of the two catalysts were compared at the same research octane number (clear) of the product. Moreover, in the butane fraction the ratio of isobutane to normal butane was higher than the ratio obtained with other catalysts. This product distribution is particularly desirable since butanes can be blended conveniently with motor gasolines to adjust their Reid vapor pressure and the isobutanes can be alkylated to produce hydrocarbons having exceedingly high octane values for use as a component of the high octane, premium grade gasolines.

While this platinized alumina silica-alumina catalyst exhibited high activity over a long life it, like other platinum-containing catalysts, eventually required regeneration. It was found that after regeneration this catalyst no longer exhibited its initial activity or, if it did exhibit its initial activity, such activity declined at an accelerated rate and after two or three regenerations the rate of decline of activity was so great the catalyst was no longer useful. In other words, the catalyst was not restored both to its original activity and stability by regeneration.

Moreover, as the octane requirement of each year's automotive engines was increased over that of the previous year's engines, the demand for higher octane number gasolines likewise increased. Since catalytically reformed hydrocarbons constitute an important component of high octane gasolines, the demand for higher octane number gasolines resulted in running reforming processes under conditions of greatly increased severity. Under such severe conditions it became necessary to regenerate the reforming catalysts more frequently so that instead of regenerating a catalyst after from 10 to 12 months of use or, expressed in another way, after perhaps 100 barrels of feed per pound of catalyst had been passed over the catalyst, the catalyst had to be regenerated after from only 3 to 4 months' operation or 20 to 30 barrels of feed per pound of catalyst.

The isomerization of the lower molecular weight alkylated benzenes, such as ethyl benzene, the xylenes and like hydrocarbons, requires for a feasible process that essentially equilibrium quantities of the isomers be produced. In order to meet this requirement, it is necessary that low pressures and long contact times be employed with the above-described platinum-containing catalysts. Under these severe conditions, it also became necessary to regenerate the catalyst frequently. It therefore became necessary to provide a catalyst which could be regenerated to restore the catalyst's initial activity and stability.

It will be seen from the data and description that follow that the cotalysts of this invention meet the above-mentioned requirements of a regenerable catalyst.

It is an object, therefore, of this invention to provide hydrocarbon conversion catalysts having improved regeneration characteristics.

It is another object of this invention to provide a unique catalyst having substantially the same ability after regeneration to promote catalytic reforming and catalytic isomerization reactions as it had before regeneration.

It is another object of this invention to provide a unique reforming and isomerization catalyst and method of making same which catalyst is capable of being restored substantially to its original activity and stability after each of a succession of regenerations.

Other objects will be apparent from the description and claims that follow.

The catalysts of this invention are composite masses each of which is a physical admixture of particles of alumina upon which is deposited platinum with particles of a silica-alumina cracking catalyst component upon which is deposited a manganese compound.

These catalysts must be prepared in a specific manner in order that all of their advantages will be realized. It has been found that the platinum should be deposited separately upon the alumina particles and then this platinum-alumina component physically admixed with the particles of silica-alumina upon which has been deposited separately the manganese compound. If this procedure is followed, there will be produced a catalyst which can be used to process very large amounts of hydrocarbons, since when it becomes spent after a period of use it can be regenerated to restore substantially its initial activity and stability and thus be prepared for reuse. The catalysts of this invention, prepared as described, may be employed through many cycles of use followed by regeneration.

The alumina component upon which the platinum is deposited may be any one or a mixture of the commercially available aluminas, such as chi alumina, gamma alumina, and eta alumina. Alternatively, a platinum compound may be deposited on a hydrated alumina such as the alpha trihydrate or the beta trihydrate which aluminas during subsequent heating to convert the platinum compound to metallic platinum are converted to one of the above-mentioned types of alumina. These aluminas and their conversions are described in the articles "Thermal Transformations of Aluminas and Alumina Hydrates," by H. C. Stumpf, A. S. Russell, J. W. Newsome, and C. M. Tucker, in Industrial and Engineering Chemistry, volume 42, page 1398 et seq. (1950), and "Surface Areas of Heated Alumina Hydrates," by Allen S. Russell and C. Norman Cochran, in Industrial and Engineering Chemistry, volume 42, page 1336 et. seq. (1950).

The platinum may be deposited onto the alumina gel or onto the alumina after drying and calcining from an aqueous solution of one of its compounds; for example, it may be deposited from an aqueous solution of chloroplatinic acid, platinus tetrammino chloride, platinous tetrammino hydroxide, platinic hexammino hydroxide, platinic hexammino chloride, chloroplatinous acid, platinic chloride, ammonium chloroplatinate, and similar platinum-containing solutions.

After contacting the alumina with the solution of the platinum compound, the excess solution, if any, is removed and the alumina dried. If desired, at this stage of the process the platinum may be reduced to the metallic state by air calcination or hydrogen reduction in accordance with well-known conventional methods. The amount of metallic platinum deposited on the carrier may range from about 0.1 percent by weight to 2.5 percent by weight, calculated on the basis of the weight of the final catalyst. Preferably, the amount of platinum should range between about 0.25 percent by weight and 1.0 percent by weight on the basis of the final catalyst.

The silica-alumina cracking component of the catalyst is preferably a commercial calcined silica-alumina cracking catalyst containing from 7 percent to 50 percent by weight of alumina, the remainder being silica. The commercial calcined synthetic silica-alumina cracking catalysts containing from 12 percent to 30 percent by weight of alumina which are currently employed by the petroleum industry in cracking processes are particularly suitable for the manufacture of the catalysts described herein.

The silica-alumina cracking component may be either freshly prepared cracking catalyst or it may be a catalyst which has had its activity altered. The activity of a cracking catalyst may be measured by a distillate-plus-loss (D+L) scale according to the method of Birkhimer et al., "A Bench Scale Test Method for Evaluating Cracking Catalysts," Proceedings of the American Petroleum Institute, Division of Refining, volume 27 (III), page 90 (1947). According to the Birkhimer et al. D+L activity measurement method, it would be possible to have a theoretical maximum D+L of 100; however, in general, the maximum D+L for a fresh synthetic silica-alumina cracking catalyst will range between 90 and 95. While there are a number of other methods of measuring the catalytic cracking activity of synthetic silica-alumina cracking catalysts which have been described in the literature, these methods employ a D+L measure having much lower values for a fresh silica-alumina cracking catalyst, usually of the order of 45 to 65 depending upon the particular test. Accordingly, when there is specified D+L scale having a practical maximum activity of 90 to 95 the Birkhimer et al. method is being employed.

A number of methods for altering the cracking activity of silica-alumina cracking catalysts have been described; however, the preferred method for the catalyst of the instant invention is treatment of the silica-alumina catalyst with steam at temperatures of from 700° F. to 1400° F., at pressure ranging from atmospheric to several hundred pounds per square inch, for a period of time sufficient to provide the desired degree of alteration.

The methods of preparing silica-alumina cracking catalysts have been published widely in both the patented art and the technological literature and since the exact method of preparing the cracking catalyst component is not a part of this invention, discussions thereof will be omitted.

It has been found that the cracking component most suitable for use in preparing the hydrocarbon conversion catalysts of this invention should have an activity ranging from 30 D+L to 95 D+L as measured by the Birkhimer et al. method. If the catalyst is to be employed in reforming hydrocarbon mixtures containing paraffins, cycloparaffins and aromatics for example, the range is preferably 40 D+L to 80 D+L. If it is to be employed in the isomerization of alkylated benzenes such as the xylenes and ethyl benzene, it is preferred that the range be from 55 D+L to 95 D+L.

Aqueous solutions of water soluble salts of manganese are utilized conveniently for depositing the manganese onto the silica-alumina cracking component. The water-soluble salts of manganese which may be utilized include the chloride, nitrate, sulfate, acetate, benzoate, formate, lactate, and similar salts. After contacting the silica-alumina with the aqueous solution of the manganese salt, the silica-alumina is separated from the solution, excess solution, if any, is removed and the silica-alumina is dried.

If the final catalyst is to be formed by pelleting the dry manganese compound impregnated silica-alumina particles admixed with the platinum-alumina particles, it is unnecessary to calcine the manganese impregnated silica-alumina before pelleting, although, it is preferred to calcine before pelleting. If, however, the catalyst is to be formed by extruding the mixture of manganese compound impregnated silica-alumina particles and platinum-alumina particles, it is necessary first to convert the manganese compound into an insoluble compound, for example, into the insoluble oxide by calcination or into the water-insoluble sulfide form. The latter conversion can be accomplished by admixing the silica-alumina particles with a manganese sulfate or chloride solution and thereafter treating with hydrogen sulfide to convert the manganese to the sulfide form. The manganese sulfide impregnated silica-alumina is thereafter dried. The calcination to produce a water-insoluble oxide or the use of hydrogen sulfide to produce the water-insoluble sulfide is necessary since the presence of free water is required during extrusion and consequently if the manganese compound were present in the form of a soluble salt, the manganese could migrate during the extrusion step to the platinum-alumina component. It has been found that manganese is a poison for platinum with respect to its activity, for example, if as little as 0.5 weight percent manganese is admixed with a platinum-alumina catalyst, the activity of the catalyst is decreased to such an extent that the octane value of the reformed product is from 5 to 6 numbers below that of the product obtained with the same platinum catalyst which has not been poisoned by manganese.

When the manganese salt is the acetate, benzoate, formate, or lactate, it is believed that upon air calcination such salts are substantially completely converted into the water-insoluble oxide. If the chloride is used, it is believed that the manganese is also converted predominantly to the oxide although small amounts of chloride can be detected in the catalyst after air calcination. When the sulfate is used for impregnation only part of the sulfate is converted to the oxide upon air calcination with the remainder of the manganese being in the form of the sulfide or the unconverted sulfate.

It has been found that if the catalyst is formed by pelleting of the components, any of the aforementioned salts may be utilized since the pelleting is conducted in the absence of free water which, if present, would permit the manganese to migrate. When the catalyst is formed by wet extrusion methods, however, it has been found necessary to utilize manganese in the form of water-insoluble compound deposited on the silica-alumina. Accordingly, for the extrusion methods, it is necessary to use a salt, for example, the acetate, benzoate, formate, or lactate, which can be calcined to manganese oxide which is insoluble or to produce the insoluble sulfide from the sulfate or chloride as has been described.

The quantity of manganese compound which is deposited on the silica-alumina may range from 0.25 percent by weight to 1.0 percent by weight of manganese based on the weight of the silica-alumina. Preferably the quantity of manganese compound expressed as manganese should range from 0.35 percent by weight to 0.75 percent by weight of the silica-alumina.

While the mechanism of the interaction between the manganese compound and the silica-alumina which produces the desired regeneration characteristics in the catalyst is not known, it is theorized that the manganese reacts with any free silica so that the silica cannot react with the platinum from the platinum-alumina portion of the catalyst thereby deactivating the catalyst. Thus, the manganese, by reacting with the free silica, increases the regeneration stability of the catalyst. Some evidence for this theory has been found by the chemical analysis of manganese-protected catalysts of the instant invention. In the samples analyzed up to 27 weight percent of the total manganese was found to be complexed with silica so as to be insoluble in 50 percent nitric acid. In practice it has been found that less than 0.25 weight percent manganese is insufficient to react with the free silica and thus prevent deactivation of the platinum, whereas more than about 1.0 weight percent of the manganese neutralizes the acid sites of the silica-alumina and thus destroys its beneficial effect.

A preferred method of making the catalysts comprises separately calcining the particles of alumina upon which platinum is deposited and the particles of silica-alumina with the manganese compound deposited thereon and thereafter pelleting the mixture of calcined particles. If it is desired, however, after the deposition and drying steps, the particles of alumina carrying the platinum compound may be admixed with the particles of the silica-alumina carrying the manganese compound, the mixture pelleted and then the pelleted mixture subjected to calcination to convert the platinum to the metallic state on the alumina and convert the manganese salt on the silica-alumina to the oxide or other compounds as has been described. In a particularly preferred method, after the platinum has been deposited on the alumina and the particles dried, such particles are admixed with silica-alumina particles upon which has been deposited manganese acetate, benzoate, formate, or lactate and the particles calcined to produce the manganese oxide. This mixture of particles in the presence of free water is extruded, dried, and calcined to convert the platinum to the metallic state.

In calcining with air, temperatures ranging between 700° F. and 1100° F. are employed, while when reducing the platinum with hydrogen temperatures from 400° F. to 1000° F. may be employed. Times ranging from 1 to 6 hours are sufficient to convert the platinum to the metallic state. Similar air calcination conditions may be employed in the case of the silica-alumina having the manganese salt deposited thereon.

It has been found for best results the individual components, prior to pelleting or extrusion, should be in the form of finely divided powders, preferably powders capable of being passed through a No. 60 U.S. Standard Sieve and at least 80 percent through a No. 100 U.S. Standard Sieve.

In order that the catalyst have the conversion and regeneration characteristics desired in accordance with this invention, the alumina component and the platinum deposited thereon should range from about 10 percent to 90 percent by weight of the final catalyst. If the catalyst is to be used primarily for reforming, the most preferred composite is obtained when the weight of the alumina-platinum component ranges from about 45 percent to 85 percent by weight of the final catalyst; if, however, the catalyst is to be used primarily for the isomerization of alkylated benzenes such as those having from 8 to 10 carbon atoms in the molecule it is preferred that the alumina-platinum component range from 25 percent to 80 percent by weight of the final catalyst.

The hydrocarbons which may be reformed utilizing the catalysts of this invention are those boiling in the gasoline-kerosene range and preferably in the gasoline range. In general, such a fraction having an initial boiling point within the range of about 50° F. to 90° F. and an end boiling point within the range of about 375° F. to 425° F. may be treated with the catalysts of this invention. The hydrocarbons in such a fraction include paraffins, cycloparaffins, and aromatics.

Reforming of these hydrocarbons is carried out under conventional conditions, i.e. temperatures ranging from 600° F. to 1000° F.; preferably, 700° F. to 1000° F.; pressures from 50 to 1000 pounds per square inch; liquid hourly space velocities from 0.5 to 3.0 volumes of hydrocarbon per volume of catalyst per hour, preferably from 0.75 to 2.0 volumes per volume per hour; and hydrogen to hydrocarbon mole ratios of from 5 to 15, preferably from 7.5 to 10.0.

The alkylated benzene hydrocarbons which may be isomerized utilizing the catalyst of this invention are the methyl or ethyl substituted benzene hydrocarbons having from 8 to 10 carbon atoms in the molecule such as the xylenes, ethyl benzene, the methyl ethyl benzenes, the trimethyl benzenes, and the diethyl benzenes.

The isomerization of these hydrocarbons utilizing the catalysts of this invention is carried out in the presence of hydrogen preferably at temperatures ranging from 700° F. to 1000° F. under pressures of from 50 to 500 pounds per square inch, with space velocities ranging from 0.5 to 6.0 volumes of liquid hydrocarbon charge per volume of catalyst per hour and hydrogen to hydrocarbon mole ratios ranging from 1:1 to 20:1. Somewhat more preferred conditions are temperatures from 800° F. to 900° F., pressures from 100 to 250 pounds per square inch, space velocities from 1.0 to 5.0 volumes of liquid hydrocarbon charge per volume of catalyst per hour and hydrogen to hydrocarbon mole ratios from 3:1 to 12:1.

In measuring the activity and stability or life of the various catalysts prepared according to the method of this invention, several tests are employed.

In the standard life and activity test the pilled catalyst is broken up and the fraction which remains on a No. 12 U.S. Standard Sieve but which passes through a No. 8 U.S. Standard Sieve, is selected. A 75-milliliter sample is packed into a stainless steel reactor of about 1-inch internal diameter with a thermocouple well concentrically located running throughout the length of the catalyst bed. A West Texas Permian-Devonian naphtha having the following properties.

ASTM distillation:
　　Overpoint _____ ° F__ 183
　　10 percent point _____ ° F__ 211
　　50 percent point _____ ° F__ 256
　　90 percent point _____ ° F__ 324
　　Clear octane number (ASTM Method D908)_ 48.0
　　Percent sulphur _____ 0.070
　　° API gravity at 60° F. _____ 57.8 is passed over the catalyst at a rate of 3 liquid volumes per volume of catalyst per hour under 500 p.s.i.g. hydrogen pressure, a 10:1 mole ratio of hydrogen to hydrocarbon, and a temperature of 960° F. at the inlet and the outlet of the catalyst bed as measured by a thermocouple in the thermocouple well.

It is well-known that platinum-containing catalysts of the type of this invention have both hydrogenation activity and dehydrogenation activity. The hydrogenation activity is important in preventing coking of the catalyst by the unsaturated reactive intermediates formed during the hydrocarbon conversion reactions. In catalytic reforming, one of the most important reactions is the dehydrogenation of the cycloparaffins to produce aromatics. The hydrogenation-dehydrogenation activity of the catalyst is important in the isomerization of the alkylated benzenes of the type described herein, for example, if the charge material contains a large proportion of the ethylbenzene, such material is converted by the hydrogenation activity of the catalyst into ethylcyclohexane. A portion of the ethylcyclohexane is converted by the isomerization reactions to the dimethylcyclohexanes which, in turn, are dehydrogenated to form the various xylene isomers.

The dehydrogenation reaction is highly endothermic, which fact has been utilized in the instant test to provide a very sensitive method of determining the dehydrogenation activity of the catalyst by measuring the temperature of the catalyst bed at various points throughout its length. Because of the dehydrogenation reaction the temperature of the catalyst bed at some distance below the inlet point decreases below the inlet temperature. As the dehydrogenation reaction approaches completion further down in the catalyst bed, the heat loss due to the reaction is balanced by the heat input of the furnace surrounding the reactor, such that the temperature of the catalyst bed again increases until at the outlet of the catalyst bed the temperature is again equal to the inlet temperature. The lowest measured temperature in this temperature "profile," called "minimum bed temperature," is a very significant indication of the activity of the catalyst and the rate of change of this temperature is a very sensitive measure of the rate of loss of catalyst activity.

Four significant results which can be expressed numerically are obtained for this test. These are:

(a) The octane number of the initial product obtained during the first 24 hours of operation.
(b) The initial minimum bed temperature measured after 24 hours of operation.
(c) The rate of change of the octane number of the product with time expressed as the decrease in octane number per day.
(d) The rate of change of the minimum bed temperature expressed as degrees per day.

This standard life and activity test is run for from 10 to 14 days or long enough to obtain a reasonable indication of the rate of decline of the octane number and the rate of increase of the minimum bed temperature. When a catalyst has high activity and high stability, i.e., a long life, the octane number of the initial product will be high, the initial minimum bed temperature will be low, the rate of decrease of the product octane number per day will be small, and the rate of increase of the minimum bed temperature per day will also be small.

In the modified activity test the catalyst is prepared and treated in exactly the same manner as in the standard life and activity test except that it is run on test for 24 hours only. The minimum bed temperature is measured after 2 hours and again after 24 hours and the octane number of the product obtained in 24 hours is determined.

In the regeneration procedure the catalyst is subjected to seven successive coking-regeneration cycles in order to reproduce in an accelerated laboratory procedure the deactivation effects which are obtained under actual plant conditions when the catalyst is employed through successive periods of reforming followed by regeneration after each reforming period. This regeneration procedure is carried out as follows: A distillation fraction from a West Texas Permian-Devonian crude source having the following properties.

ASTM distillation:
| | | |
|---|---|---|
| Overpoint | °F | 110 |
| 5 percent | °F | 158 |
| 10 percent | °F | 180 |
| 20 percent | °F | 206 |
| 50 percent | °F | 262 |
| 80 percent | °F | 334 |
| 90 percent | °F | 418 |
| 95 percent | °F | 510 |
| End point | °F | 510 |
| Recovery | percent | 95.5 |
| Residue | do | 3.5 | is passed over 50 grams of catalyst which has been reduced in particle size such that it will pass through a No. 8 U.S. Standard Sieve, but be retained on a No. 12 U.S. Standard Sieve. This catalyst is placed in the form of a fixed bed in a reactor having an internal diameter of approximately one inch. The catalyst after contact with hydrogen for two hours at 950° F. is purged for one hour with nitrogen at 1050° F. The distillate fraction is then passed over the catalyst at 1050° F. at the rate of 2 milliliters per minute for 12 minutes. Since no hydrogen is present, the catalyst becomes coked during this treatment; consequently, following the 12 minutes on stream time, the catalyst is purged with nitrogen at the rate of 76 milliliters per minute for 39 minutes, burned with a mixture of air at the rate of 160 milliliters per minute and nitrogen at the rate of 640 milliliters per minute for a total of 304 minutes for the air-nitrogen mixture and, finally, the catalyst is purged with nitrogen at 76 milliliters per minute for five minutes.

This constitutes a cracking and regeneration cycle and this cycle is repeated six more times for a total of seven cycles. After the seventh cycle, however, the catalyst is burned with air at 800 milliliters per minute for four hours.

In order to determine the utility of the catalysts of the instant invention, a portion of a freshly prepared catalyst was subjected to the standard life and activity test. Another portion of the same catalyst was subjected to the regeneration procedure and after the regeneration procedure this portion of the catalyst was subjected to the standard life and activity test. The results obtained by the standard life and activity test with the portion of the fresh catalyst was then compared with the results obtained by the standard life and activity test made on the catalyst which had been subjected to the regeneration procedure. This comparison showed the regeneration stability of the catalysts.

In some instances the fresh catalyst was subjected also to the modified activity test and another portion of the catalyst subjected to the regeneration procedure and then the modified activity test and the results before regeneration were compared with the results obtained after regeneration. This latter method was preferred since it did not require the extremely long times for tests required by the standard life and activity test, but was equally effective in showing the regeneration stability of the catalysts.

In order that the catalysts tested would be comparable to each other, a uniform procedure of catalyst preparation was employed. A sample of eta alumina having a surface area of approximately 450 square meters per gram as measured by the aforementioned adsorption method, and having a particle size such that it would all pass through a No. 60 U.S. Standard Sieve and at least 80 percent of it would pass through a No. 100 U.S. Standard Sieve, was impregnated by intimately contacting it with a solution of chloroplatinic acid using 0.45 milliliter of the chloroplatinic acid solution per gram of the activated alumina. With this concentration of the platinum solution the final platinum concentration based on the weight of the alumina amounted to 0.69 percent by weight. After impregnating, the impregnated alumina was dried in an oven at approximately 212° F., and finally air calcined in a furnace for 3 hours at 1050° F. to convert the chloroplatinic acid to platinum metal. Since agglomeration of particles occurs during impregnation the catalyst was again screened through a No. 60 U.S. Standard Sieve to remove the agglomerates.

The silica-alumina component was deactivated by steaming to reduce its activity as measured by its D+L. A fresh commercial cracking catalyst containing 13 percent by weight alumina and 87 percent by weight silica was steamed at a temperature of 1050° F. and 10 p.s.i.g. steam pressure for 18 hours so that the resultant catalyst activity was 75 D+L as measured by the Birkhimer et al. method. This material which was in the form of a finely divided powder of approximately the same particle size as the alumina was then contacted with an aqueous solution of manganese sulfate using 0.45 milliliter of solution per gram of silica-alumina of such concentration that after drying there was deposited on the silica-alumina the desired percent by weight of the manganese. The impregnated silica-alumina was dried in an oven at approximately 212° F. and air calcined at 1050° F. for 3 hours in a furnace.

Eight parts by weight of the platinized alumina were then thoroughly mixed with two parts by weight of the manganese impregnated silica-alumina. The composite was pelleted using a conventional Stokes pelleting machine. The catalysts prepared according to this procedure contain on the alumina 0.55 percent platinum by weight of the final catalyst.

The experiments which follow were carried out to demonstrate the utility and superiority of the catalysts of the instant invention for the conversion of hydrocarbons and to illustrate the preferred and specific embodiments of the invention. It is to be understood, however, that the scope of the invention is not to be construed as limited to the specific disclosures made in these examples.

EXAMPLE I

A catalyst was prepared according to the described uniform procedure except that the silica-alumina was not contacted with a manganese salt solution so there was no manganese compound on the silica-alumina. This catalyst, designated "I," which contained 0.55 weight percent platinum based on the weight of the final catalyst and which corresponded to previously known catalysts, was subjected to the regeneration procedure and then to the modified activity test. The results of these tests are set forth in Table I.

EXAMPLE II

Four catalysts were prepared according to the uniform procedure employing manganese sulfate solutions to impregnate the silica-alumina. In preparing the first catalyst designated "IIA" the concentration of the manganese sulfate solution was adjusted so that there was deposited the equivalent of 0.25 percent by weight of manganese based on the weight of the silica-alumina. The manganese sulfate concentration of the solution used to impregnate the silica-alumina of the second catalyst "IIB" was adjusted so that there was deposited the equivalent of 0.5 percent by weight of manganese based on the weight of the silica-alumina. The manganese sulfate concentration of the solutions used to impregnate the silica-alumina of the third and fourth catalysts "IIC" and "IID" were adjusted such that there was deposited, respectively, the equivalent of 0.75 weight percent and 1.0 weight percent of manganese based on the weight of the silica-alumina. These catalysts were subjected to the regeneration procedure followed by the modified activity test and in the case of the second catalyst, "IIB," the regeneration procedure was also followed by the standard life and activity test. The results of these tests are shown in Table I.

EXAMPLE III

Two catalysts were prepared according to the uniform procedure with certain modifications thereto. Instead of using a 75 D+L activity level of silica-alumina 60 D+L silica-alumina was prepared by steaming fresh silica-alumina at 1050° F. for 18 hours under 30 p.s.i.g. steam pressure. There was deposited from a manganese sulfate solution 0.5 weight percent manganese based on the silica-alumina. One catalyst, "IIIA," was finished by calcining at a temperature of 750° F. whereas the other catalyst, "IIIB," was calcined according to the standard method, i.e. at 1050° F. One portion of each of these catalysts was subjected to the standard life and activity test and to the modified activity test and another portion of each of these catalysts was subjected to the regeneration procedure followed by both the modified activity test and the standard life and activity test. The results of these tests are set forth in Table I.

EXAMPLE IV

A catalyst, designated "IV," was prepared following the uniform procedure using an aqueous solution of manganese chloride for the impregnation of the silica-alumina. The concentration of the manganese chloride solution was adjusted so that there was deposited on the silica-alumina 0.5 percent by weight of the manganese based on the weight of the silica-alumina. This catalyst was subjected to the regeneration procedure followed by the modified activity test and the results of such tests are incorporated into Table I.

EXAMPLE V

A portion of the 60 D+L silica-alumina cracking catalyst used in the prepartion of catalyst "IIIB" was impregnated with a manganese acetate solution of such concentration and in such an amount that, after drying at 230° F. and calcining for 3 hours at 1050° F., 0.5 percent manganese by weight of the silica-alumina was deposited on the silica-alumina in the form of the water-insoluble oxide.

A sample of drum dried alumina hydrate powder containing 0.6 weight percent of platinum on an ignited weight basis was obtained by impregnating the alumina hydrate slurry with a chloroplatinic acid solution and hydrogen sulfide. The platinized alumina hydrate powder had been prepared in accordance with the procedure described in U.S. Patent No. 2,838,444 and contained 57.28 percent by weight of solids as determined by heating at 1100° C. for two hours. The alumina trihydrate content of the alumina portion of the powder was 73 percent by weight, as determined by X-ray diffraction analysis on samples dried at 230° F. A 1395-gram portion of this platinized alumina hydrate powder was thoroughly mixed with 200 grams of the manganese oxide silica-alumina powder prepared above and 260 milliliters of water were added to the mixture with additional thorough mixing. The mixture was extruded through a 1/16 inch die on a 2-inch Welding Engineers Auxiliary Worm Extruder (Model 2010) to form extrudates 1/16 inch to 1/4 inch in length. The extruded material was dried at approximately 230° F. and air calcined at 900° F. This catalyst was subjected to the regeneration procedure and then to the modified activity test. The results of these tests are set forth in Table I.

In comparing the test results set forth in Table I obtained on the catalysts described in the examples, it should be noted that only those catalysts which after regeneration show both a low minimum bed temperature and a high octane number after 24 hours on the modified activity test have suitable regeneration characteristics in accordance with this invention. Likewise, on the standard life and activity test only those catalysts having both a low rate of minimum bed temperature increase per day and a low rate of octane number decline per day are suitable. While the rate of increase of minimum bed temperature as shown by comparing the temperature after two hours with the temperature after 24 hours is an indication of the catalyst's regeneration stability, the minimum bed temperature level after 24 hours is of greater importance in indicating regeneration stability.

*Table I*

| Catalyst No. and test conditions | Wt. percent Mn on silica-alumina | Minimum bed temp., °F. | | Octane No.,[1] after 24 hrs. | Min. bed temp., increase °F. per day | Octane No.,[1] decrease per day |
| --- | --- | --- | --- | --- | --- | --- |
| | | After 2 hrs. | After 24 hrs. | | | |
| I (after regeneration) | None | 896 | 901 | 97.0 | | |
| IIA (after regeneration) | 0.25 | 895 | 899 | 97.0 | | |
| IIB (after regeneration) | 0.5 | 870 | 873 | 97.9 | 0.36 | 0.27 |
| IIC (after regeneration) | 0.75 | 880 | 883 | 97.0 | | |
| IID (after regeneration) | 1.0 | 878 | 882 | 93.0 | | |
| IIIA (before regeneration) | 0.5 | 877 | 878 | 95.5 | 0.10 | 0.09 |
| IIIA (after regeneration) | 0.5 | 875 | 878 | 94.3 | 0.42 | 0.16 |
| IIIB (before regeneration) | 0.5 | 870 | 871 | 95.5 | 0.40 | 0.08 |
| IIIB (after regeneration) | 0.5 | 880 | 885 | 94.5 | 0.89 | 0.26 |
| IV (after regeneration) | 0.5 | 882 | 883 | 97.7 | | |
| V (after regeneration) | 0.5 | 880 | 880 | 94.4 | | |

[1] Clear Octane Number as measured by ASTM Method D-908.

A comparison of the results obtained utilizing catalyst "I" with the results obtained utilizing catalysts "IIB" or "IIC," for example, demonstrates that it is necessary to have a manganese compound on the silica-alumina in order to provide a catalyst which is regenerable. It will be noted that although the octane number of the products from these catalysts is substantially the same, with catalyst "I" the minimum bed temperature is very high, whereas with catalysts "IIB" and "IIC" the minimum bed temperature is at a reasonable level. At the high level of minimum bed temperature shown by "I," the catalyst is showing such low activity for the dehydrogenation reaction that it is not, in practice, a useful catalyst.

In comparing catalyst "IIA" with catalyst "I" it is apparent that the quantity of manganese should not be less than 0.25 weight percent since catalyst "IIA" shows only slightly improved regeneration stability as compared with catalyst "I" which has no manganese on the silica-alumina.

A comparison of the results obtained with catalysts "IIB" and "IIC" shows that preferably the amount of manganese on the silica-alumina should not be greater than 0.75 percent with 0.5 percent being a particularly preferred level. Catalyst "IID" gives a lower octane number product, thus demonstrating that the manganese should not be above the 1.0 weight percent level.

Catalysts "IIIA" and "IIIB" demonstrate that manganese when utilized in the preferred range produces catalysts having exceptionally good regeneration stability. Moreover, these catalysts show that the activity of the silica-alumina may be varied and that the calcination temperature may be varied without materially affecting the regenerability of the catalysts.

Catalyst "IV" demonstrates that other manganese salts as well as the sulfate may be employed for depositing the manganese compound on the silica-alumina.

Catalyst "V" shows that a preferred embodiment of the invention wherein the composite masses are made by extrusion has a regeneration stability comparable with that of catalysts made by pelleting.

EXAMPLE VI

A portion of the catalyst designated "IIB" was subjected to additional testing to determine its acitvity and stability for reforming after regeneration following severe reforming conditions.

This test employed the apparatus used in the standard life and activity test. As in the standard life and activity test the pilled catalyst was broken up and the fraction which remained on a No. 12 U.S. Standard Sieve, but which passed through a No. 8 U.S. Standard Sieve, was selected. A 75-milliliter sample was packed into the reactor and the West Texas Permian-Devonian naphtha utilized in the standard life and activity test was passed over the catalyst at a rate of three liquid volumes per volume of catalyst per hour under 500 p.s.i.g. hydrogen pressure, a 5:1 mole ratio of hydrogen to hydrocarbon and a temperature of 960° F. at the inlet and the outlet of the catalyst bed. The naphtha was passed over the catalyst for 24 hours and during that time because of the low hydrogen to hydrocarbon mole ratio coke was laid down on the catalyst. The catalyst was regenerated after 24 hours at atmospheric pressure starting at 750° F. using 20 cubic feet per minute of nitrogen mixed with one cubic foot of air. When the exothermic reaction had stopped the temperature was raised to 900° F. and when the burning had stopped again the air rate was increased at the rate of one cubic foot per minute increments until it reached ten cubic feet per minute. When the air rate had reached ten cubic feet per minute at leveled out conditions, the nitrogen flow was stopped and the catalyst was burned in air for four hours. The catalyst was then purged with nitrogen and placed back on stream with the naphtha under the conditions set forth above. This was repeated for five cycles and following the fifth regeneration the catalyst was subjected to the standard life and activity test. After being on this test for 24 hours, the product had a 94.8 octane number and the minimum bed temperature was 875° F. Upon completion of the test it was found that the minimum bed temperature decreased 0.67° F. per day and the octane decreased 0.22 per day. These results demonstrate that this catalyst may be regenerated to its initial activity and stability after it has become spent during use and that this regeneration ability is retained a number of cycles.

EXAMPLE VII

A sample of fresh commercial cracking catalyst containing approximately 13 percent by weight alumina and 87 percent by weight silica was steamed at a temperature of 1050° F. and 10 p.s.i.g. steam pressure for 18 hours so that activity of the catalyst was reduced to 75 D+L as measured by the Birkhimer et al. method. This partially deactivated catalyst which was in the form of a finely-divided powder all of which would pass through a No. 60 U.S. Standard Sieve and at least 80 percent of which would pass through a No. 100 U.S. Standard Sieve was contacted with an aqueous manganese acetate solution of such concentration and in such an amount that, after drying at 230° F. and air calcining for three hours at 1050° F., 0.5 percent manganese by weight of the silica-alumina was deposited on the silica-alumina in the form of the water-insoluble oxide.

A sample of drum dried alumina hydrate powder containing 0.785 weight percent of platinum on an ignited weight basis was obtained by impregnating the alumina hydrate slurry with a chloroplatinic acid solution and hydrogen sulfide. The platinized alumina hydrate powder was prepared in accordance with the procedure described in U.S. Patent No. 2,838,444 and contained 64.70 percent by weight of solids as determined by heating at 1100° F. for two hours. The alumina trihydrate content of the powder was approximately 75 percent by weight, as determined by X-ray diffraction analysis on samples dried at 230° F. A 773-gram portion of this platinized alumina hydrate powder was thoroughly mixed with 500 grams of the manganese oxide silica-alumina powder prepared above and 480 milliliters of water were added to the mixture with additional thorough mixing.

The mixture was extruded through a 1/16 inch die on a worm extruder to form extrudates 1/16 inch to 1/4 inch in length. The extruded material was dried at approximately 230° F. and air-calcined at 900° F. The final catalyst was composed of approximately equal parts by weight of the platinized alumina component and the manganese oxide silica-alumina component.

This catalyst was employed in isomerizing alklyated aromatic hydrocarbons utilizing a 75 cc. portion in the presence of hydrogen under the conditions set forth in Table II. The composition of the charge and the composition of the products obtained are also shown in Table II. The weight balance for the experiment was approximately 100 percent.

EXAMPLE VIII

Another catalyst was prepared by the same method employed in Example VII, except that the amount of platinum on the alumina was 0.8 weight percent, the platinized alumina hydrate powder contained 67.55 percent by weight of solids and the alumina trihydrate content of the powder was approximately 77 percent by weight. A 5500-gram sample of this platinized alumina hydrate powder was thoroughly mixed with 3720 grams of the manganese oxide silica-alumina powder, prepared as described in Example VII and 3500 milliliters of water were added to the mixture with additional thorough mixing.

The mixture was extruded, dried and calcined as described in Example VII. The final catalyst contained approximately equal parts by weight of the platinized alumina component and the manganese oxide silica-alumina component. This catalyst was also tested for the isomerization of alkylated benzene hydrocarbons. The test conditions and composition of charge and products are shown in Table II. The weight balance for this experiment was also approximately 100 percent.

The catalyst was then subjected to the regeneration procedure (7 cycles) and again tested for its isomerization activity using the same feed as for the test of the fresh catalyst. These results are also shown in Table II.

*Table II*

| Conditions | Example VII | Example VIII Catalyst | |
|---|---|---|---|
| | | Fresh | Regenerated |
| Temperature, ° F | 850 | 850 | 850 |
| Pressure (pounds per square inch guage) | 175 | 175 | 175 |
| Space velocity (liquid volumes of charge per volume of catalyst per hour) | 1.67 | 1.18 | 1.17 |
| Hydrogen to Hydrocarbon, mole ratio | 8.5 | 9.0 | 10.2 |

| Composition | Charge, weight percent | Products, weight percent of charge, no loss basis | Charge, weight percent | Products, weight percent of charge, no loss basis | |
|---|---|---|---|---|---|
| | | | | Catalyst | |
| | | | | Fresh | Regenerated |
| CH₄ | | 0.17 | | 0.14 | 0.03 |
| C₂H₆ | | 0.10 | | 0.20 | 0.12 |
| C₃H₈ | | 0.30 | | 0.24 | 0.23 |
| C₄H₁₀ | | 0.84 | | 0.50 | 0.42 |
| C₅H₁₂ | | 0.64 | | 0.35 | 0.31 |
| C₆H₁₄+higher mol. wt. paraffins | 2.59 | 1.13 | 1.1 | 1.13 | 0.60 |
| C₆+higher mol. wt. cyclo-paraffins | 1.46 | 2.37 | 0.5 | 1.79 | 1.85 |
| Benzene | 0.92 | 1.35 | 0.7 | 1.62 | 2.01 |
| Toluene | 1.11 | 2.43 | 1.2 | 2.18 | 2.48 |
| Alkylated benzenes, mol. wt.=120 | 0.10 | 1.63 | 0.4 | 1.60 | 2.01 |
| Alkylated benzenes, mol. wt.=134 | 0.67 | 0.32 | 0.0 | 0.41 | 0.60 |
| Alkylated benzenes, mol. wt.=106 | 93.15 | 88.72 | 96.1 | 89.84 | 89.34 |
| Ethyl benzene | 12.97 | 12.22 | 22.8 | 18.76 | 17.68 |
| Ortho-xylene | 25.81 | 19.17 | 4.2 | 15.15 | 15.11 |
| Meta-xylene | 47.18 | 40.67 | 53.3 | 38.28 | 39.20 |
| Para-xylene | 7.19 | 16.66 | 15.8 | 17.65 | 17.35 |

It will be seen from these data that one may produce para-xylene from a xylene charge deficient in that isomer (Example VII), or ortho-xylene from a charge deficient in ortho-xylene by isomerization (Example VIII) utilizing the catalysts of this invention. Example VIII also demonstrates that the catalysts of this invention may be regenerated many times without losing their isomerization activity since the yield of products obtained after regeneration is substantially the same as the yield obtained with the fresh catalyst.

The examples demonstrate that the catalysts of this invention are highly useful for the isomerization of hydrocarbons and for the reforming of hydrocarbons in processes operating under such conditions that the catalyst must be regenerated periodically. These examples also demonstrate that this unique regenerability of the catalysts of the invention results from the deposition of a manganese compound upon a silica-alumina component which combination is composited with a platinum-on-alumina component.

It will be understood, however, that numerous variations from these embodiments are possible without departing from the scope of the claims.

We claim:

1. A hydrocarbon conversion catalyst consisting essentially of composite masses, each of said masses comprising a physical mixture of particles of platinized alumina and particles of a calcined silica-alumina cracking component containing at least one manganese compound selected from the group consisting of the oxides, sulfides and sulfates of manganese, said platinized alumina comprising from about 10 percent to 90 percent by weight of the final catalyst, the platinum on the alumina comprising from about 0.1 percent to 2.5 percent by weight of the final catalyst, the manganese of the manganese compound ranging in an amount from 0.35 percent to 0.75 percent by weight of the silica-alumina cracking component and the silica-alumina cracking component being further characterized by having an alumina content ranging from 7 percent by weight to 50 percent by weight and a catalytic cracking activity within a range between 30 and 95 as compared with a theoretical maximum catalytic cracking activity of 100 and a practical maximum catalytic cracking activity of between 90 and 95 on a distillate-plus-loss scale for the measurement of the catalytic cracking activity of a cracking catalyst.

2. The catalyst according to claim 1 wherein the composite masses are in the form of pelleted masses.

3. A hydrocarbon conversion catalyst consisting essentially of extruded masses, each of said masses comprising a physical mixture of particles of platinized alumina and particles of a calcined silica-alumina cracking component containing at least one water-insoluble manganese compound selected from the group consisting of the water-insoluble oxides and sulfides of manganese, said platinized alumina comprising from about 10 percent to 90 percent by weight of the final catalyst, the platinum on the alumina comprising from about 0.1 percent to 2.5 percent by weight of the final catalyst, the manganese of the manganese compound ranging in an amount from 0.35 percent to 0.75 percent by weight of the silica-alumina cracking component and the silica-alumina cracking component being further characterized by having an alumina content ranging from 7 percent by weight to 50 percent by weight and a catalytic cracking activity within a range between 30 and 95 as compared with a theoretical maximum catalytic cracking activity of 100 and a practical maximum catalytic cracking activity of between 90 and 95 on a distillate-plus-loss scale for the measurement of the catalytic cracking activity of a cracking catalyst.

4. A process for the production of a catalyst useful for the conversion of hydrocarbons which comprises contacting particles of a silica-alumina cracking catalyst component with an aqueous solution of a water-soluble manganese compound of such concentration and in such amount that the manganese of the manganese compound contained in said silica-alumina in the finished catalyst is in the range of from 0.35 percent to 0.75 percent by weight of the silica-alumina, separating said solution from the silica-alumina, drying the silica-alumina, converting the manganese compound on the silica-alumina into at least one compound selected from the group consisting of manganese oxides, manganese sulfides and mixtures of manganese oxides, sulfides and sulfate, admixing said silica-alumina cracking catalyst component particles containing said manganese compound with particles of platinized alumina, the amount of said platinized alumina comprising from about 10 percent to 90 percent by weight of the final catalyst, the platinum on said alumina comprising from about 0.1 percent to 2.5 percent by weight of the final catalyst, said silica-alumina cracking catalyst component being further characterized by having an alumina content of from 7 percent to 50 percent by weight and having a catalytic cracking activity with the range from 30 to 95 as compared with a theoretical maximum catalytic cracking activity of 100 and a practical maximum catalytic cracking activity of between 90 and 95 on a distillate-plus-loss scale for the measurement of the catalytic cracking activity of a cracking catalyst and forming the admixture into composite masses.

5. The process according to claim 4 wherein the manganese compound is converted by calcination.

6. A process for the production of a catalyst useful for the conversion of hydrocarbons which comprises contacting particles of a silica-alumina cracking catalyst component with an aqueous solution of a water-soluble manganese compound of such concentration and in such amount that the manganese of the manganese compound contained in said silica-alumina in the finished catalyst is in the range of from 0.35 percent to 0.75 percent by weight of the silica-alumina, separating said solution from the silica-alumina, drying the silica-alumina, converting the water-soluble manganese compound on the silica-alumina into a water-insoluble manganese compound, admixing said silica-alumina cracking catalyst component particles containing said water-insoluble manganese compound with particles of platinized alumina, the amount of said platinized alumina comprising from about 10 percent to 90 percent by weight of the final catalyst, the platinum on said alumina comprising from about 0.1 percent to 2.5 percent by weight of the final catalyst, said silica-alumina cracking catalyst component being further characterized by having an alumina content of from 7 percent to 50 percent by weight and having a catalytic cracking activity within the range from 30 to 95 as compared with a theoretical maximum catalytic cracking activity of 100 and a practical maximum catalytic cracking activity of between 90 and 95 on a distillate-plus-loss scale for the measurement of the catalytic cracking activity of a cracking catalyst, and extruding the admixture into composite masses.

7. A process for the production of a catalyst useful for the conversion of hydrocarbons which comprises contacting particles of a silica-alumina cracking catalyst component with an aqueous solution of a water-soluble manganese compound of such concentration and in such amount that the manganese of the manganese oxide contained in said silica-alumina in the finished catalyst is in the range of from 0.35 percent to 0.75 percent by weight of the silica-alumina, separating said solution from the silica-alumina, drying the silica-alumina, converting the manganese compound on the silica-alumina by calcination into manganese oxide, admixing said silica-alumina cracking catalyst component particles containing said manganese oxide with particles of platinized alumina, the amount of said platinized alumina comprising from about 10 percent to 90 percent by weight of the final catalyst, the platinum on said alumina comprising from about 0.1 percent to 2.5 percent by weight of the final catalyst, said silica-alumina cracking catalyst component being further characterized by having an alumina content of from 7 percent to 50 percent by weight and having a catalytic cracking activity within the range from 30 to 95 as compared with a theoretical maximum catalytic cracking activity of 100 and a practical maximum catalytic cracking activity of between 90 and 95 on a distillate-plus-loss scale for the measurement of the catalytic cracking activity of a cracking catalyst, and extruding the admixture into composite masses.

8. A process for the production of a catalyst useful for the conversion of hydrocarbons which comprises contacting particles of a silica-alumina cracking catalyst component with an aqueous solution of manganese acetate of such concentration and in such amount that the manganese of the manganese oxide contained in said silica-alumina in the finished catalyst is in the range of from 0.35 percent to 0.75 percent by weight of the silica-alumina, separating said solution from the silica-alumina, drying the silica-alumina, converting the manganese acetate on the silica-alumina by calcination into manganese oxide, admixing said silica-alumina cracking catalyst component particles containing said manganese oxide with particles of platinized alumina, the amount of said platinized alumina comprising from about 10 percent to 90 percent by weight of the final catalyst, the platinum on said alumina comprising from about 0.1 percent to 2.5 percent by weight of the final catalyst, said silica-alumina cracking catalyst component being further characterized by having an alumina content of from 7 percent to 50 percent by weight and having a catalytic cracking activity within the range from 30 to 95 as compared with a theoretical maximum catalytic cracking activity of 100 and a practical maximum catalytic cracking activity of between 90 and 95 on a distillate-plus-loss scale for the measurement of the catalytic cracking activity of a cracking catalyst, and extruding the admixture into composite masses.

References Cited by the Examiner

UNITED STATES PATENTS

| 2,848,510 | 8/58 | Myers et al. | 252—471 X |
| 2,854,403 | 9/58 | Weisz | 252—460 X |
| 2,892,003 | 6/59 | Weisz | 252—455 X |

MAURICE A. BRINDISI, *Primary Examiner.*

JOSEPH R. LIBERMAN, *Examiner.*